Patented June 13, 1944

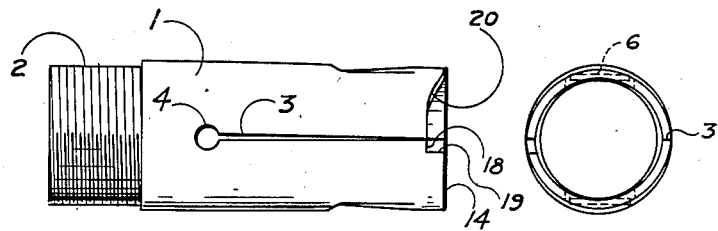
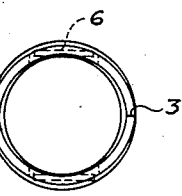
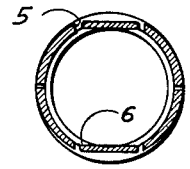
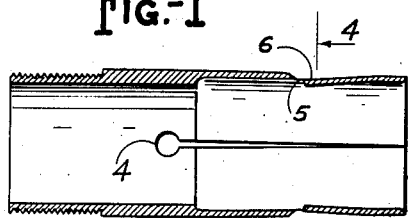
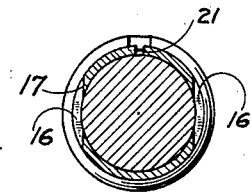
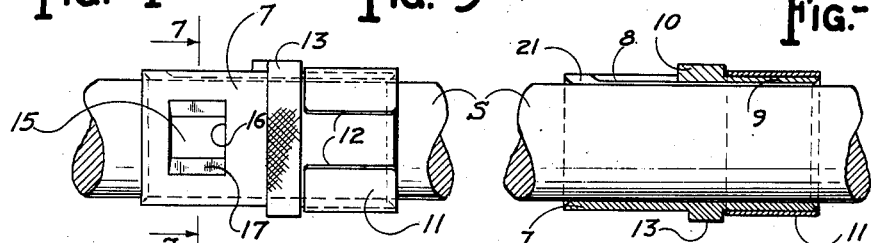
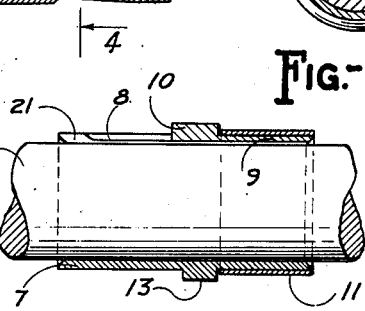
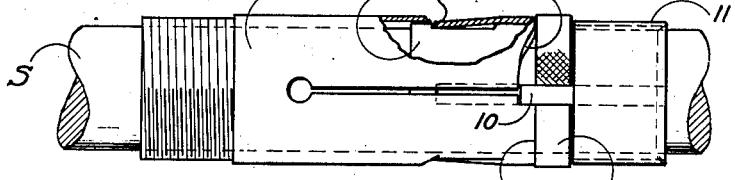
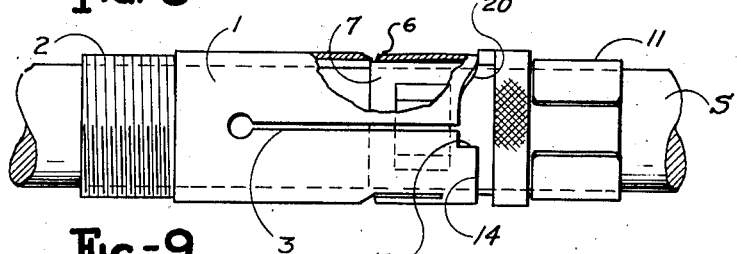

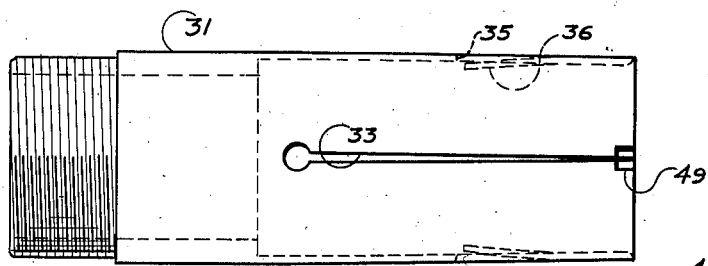
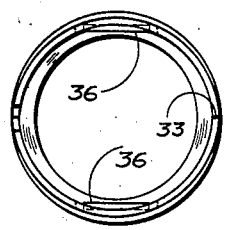
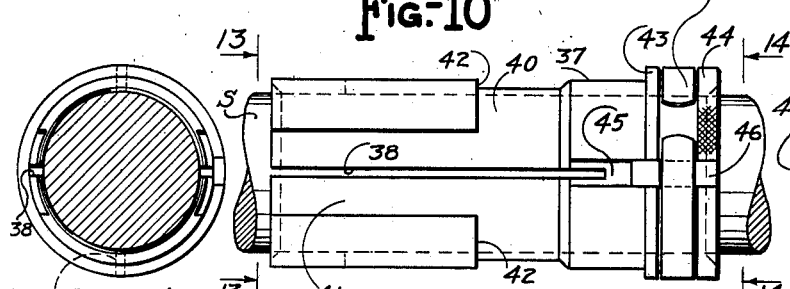
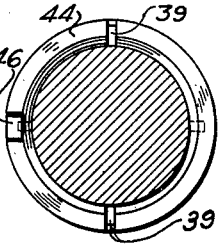
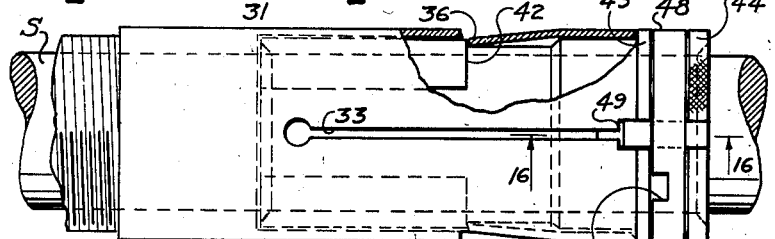
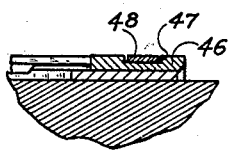
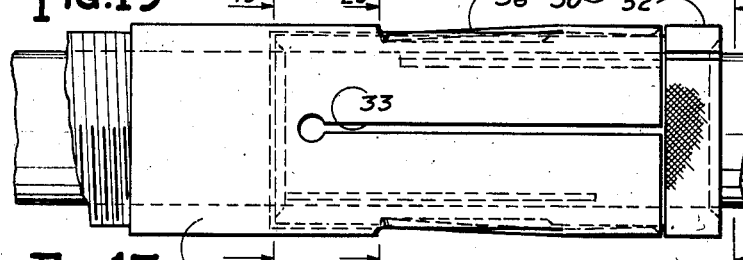
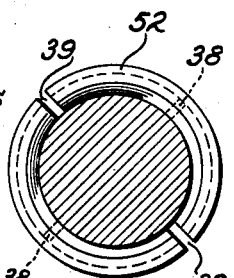
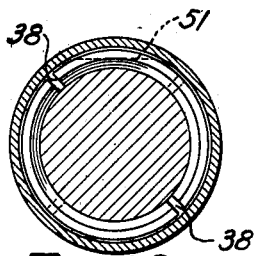
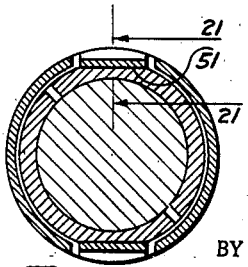
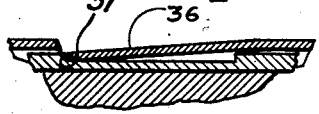

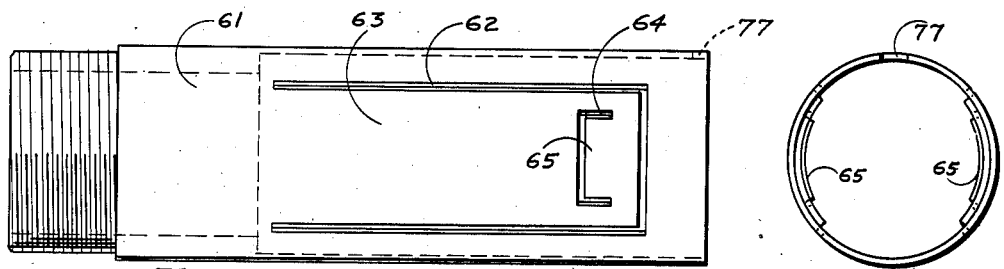
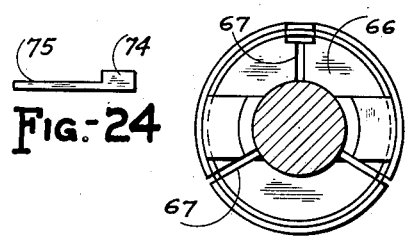
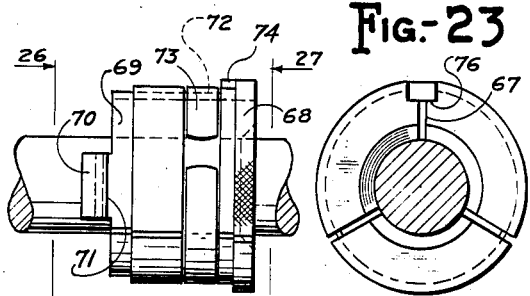
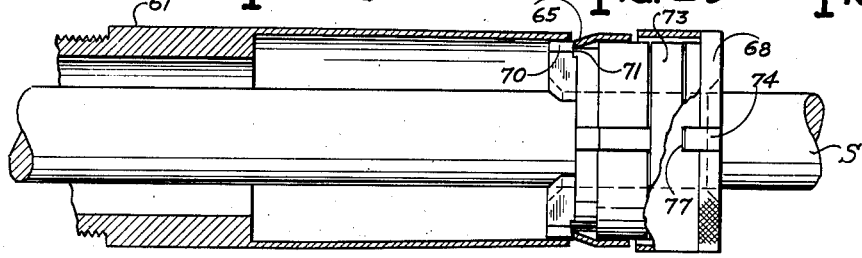
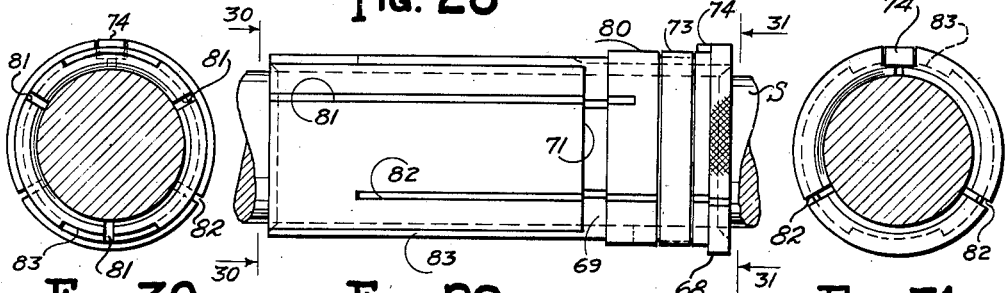

2,351,220

UNITED STATES PATENT OFFICE 2,351,220

PUSHER

Stoddard B. Martin, Lakewood, Ohio

Application May 28, 1941, Serial No. 395,582

15 Claims. (Cl. 29—62)

This invention relates to feed fingers or pushers for automatic screw machines and the like.

The spindle of an automatic screw machine is ordinarily a hollow tube within which is disposed a collet tube having a collet arranged to grip and rotate a bar of stock fed axially therethrough. At the end of each cycle of operations of the machine, the projecting end of stock is cut off from the bar, the collet opens, a new length of stock is fed forwardly and the collet is again closed to grip the stock and repeat the cycle of operations. The stock is ordinarily fed forward by a pusher or feed finger carried by a reciprocating pusher tube disposed within the collet tube. It has been proposed to use master pushers in which the gripping surfaces that engage the stock are provided with a bushing removable from the pusher shell so that gripping surfaces of the desired diameter may be placed in the pusher to accommodate any particular size of stock. One of the outstanding disadvantages of such master pushers which have heretofore been used is that the pushers have only been capable of receiving stock somewhat smaller than the maximum capacity of the machine. Accordingly in such devices it has been necessary, when it is desired to operate on stock of the maximum capacity of the machine, to replace the master pusher with a different type of pusher.

The principal object of this invention is to arrange the parts of a master pusher so that it is capable of handling stock of a diameter up to and including the maximum capacity of the machine. Other objects are to locate the abutment means between the shell and the pusher within the wall thickness of the shell and pusher; to form the pusher shell with inwardly directed spring portions engaging the bushing and providing part of the pressure of the bushing upon the stock, to form the spring portion of the bushing with integral abutment means to prevent escape of the bushing from the shell; and to arrange abutment means between the shell and bushing beyond the front end of the shell so that said means are accessible to facilitate removal of the bushing and do not subtract from the space within the shell available for stock.

In the accompanying drawings:

Figure 1 is a side elevation of a pusher shell embodying the present invention;

Figure 2 is an end view of the shell shown in Figure 1;

Figure 3 is a longitudinal section through the shell shown in Figure 1.

Figure 4 is a cross-section taken on the line 4—4 of Figure 3;

Figure 5 is a side elevation of the bushing removed from the shell and engaging the stock;

Figure 6 is a longitudinal section through the bushing shown in Figure 5;

Figure 7 is a cross-section taken on line 7—7 of Figure 5;

Figure 8 is a side elevation of the complete pusher with parts in section to illustrate the construction;

Figure 9 is a view similar to Figure 8 but showing the bushing rotated to permit removal of the bushing from the shell;

Figure 10 is a side elevation of a slightly modified shell for a pusher embodying this invention;

Figure 11 is an end view of the shell shown in Figure 10;

Figure 12 is a side elevation of a bushing for cooperation with the shell shown in Figure 10;

Figure 13 is a section on the line 13—13 of Figure 12;

Figure 14 is a section on the line 14—14 of Figure 12;

Figure 15 is a side elevation of the shell of Figure 10 assembled with the bushing of Figure 12, parts being broken away to illustrate the construction;

Figure 16 is a section taken substantially on the line 16—16 of Figure 15;

Figure 17 is a side elevation of a slightly modified pusher in which the key is omitted;

Figure 18 is a section on the line 18—18 of Figure 17;

Figure 19 is a section on the line 19—19 of Figure 17;

Figure 20 is a section on the line 20—20 of Figure 17;

Figure 21 is a section on the line 21—21 of Figure 20;

Figure 22 is a side elevation of a further modified form of shell for use in a pusher embodying the present invention;

Figure 23 is an end view of the shell shown in Figure 22;

Figure 24 is a detail side elevation of a key removed from the pusher;

Figure 25 is a side elevation of a bushing for use with the shell shown in Figure 22;

Figure 26 is a section on the line 26—26 of Figure 25;

Figure 27 is a section on the line 27—27 of Figure 25;

Figure 28 is a longitudinal section through the shell of Figure 22 with the bushing of Figure 25 assembled therein;

Figure 29 is a side elevation of a slightly modified form of bushing for use with the shell shown in Figure 22;

Figure 30 is a section on the line 30—30 of Figure 29;

Figure 31 is a section on the line 31—31 of Figure 29.

Referring to the drawings, the pusher of the present invention embodies generally a pusher shell or the like in which may be secured a bushing of any desired size of internal opening and provided with means for resiliently gripping the stock. In the arrangement shown in Figures 1 to 9, inclusive, a shell 1, which may be integral with the pusher tube or secured thereto by screw threads 2 or the like, is provided with longitudinal slots 3 extending inwardly from the front face of the pusher and terminating in drilled holes 4. Preferably the shell is slotted and the two sides are bent inwardly before hardening so that the shell itself exerts a spring pressure upon the bushing which engages the stock. The shell is also provided with U-shaped cuts 5 forming rearwardly facing abutment wings 6.

The bushing illustrated in Figures 5 to 9, inclusive, comprises a tubular member 7 split for its full length so as to form an expansible member to engage the stock S. The bushing is grooved as indicated at 8 to receive a key 9 having a head 10 projecting outwardly beyond the surface of the bushing. The groove 8 may be cut in the free edges formed by the longitudinal split 21, as shown in Figure 6. Preferably a spring 11 surrounds the front end of the bushing and overlies the key 9 so as to retain the same in the groove 8. The spring has its free ends 12 spaced apart a sufficient distance to permit it to be turned to release the key 9.

Intermediate its ends the bushing is provided with a radially projecting shoulder 13 arranged to engage the front edge 14 of the shell 1 to limit movement of the bushing in the shell.

Near its rear end the bushing is provided on opposite sides with straight milled cuts 15 which, in a bushing of the maximum size, cut entirely through the wall of the bushing as illustrated in Figures 5 and 7. The cuts 15 form forwardly facing abutment shoulders 16 and flat surfaces 17 merging into the exterior surface of the bushing. It will be understood that in bushings having a smaller internal opening than the bushing illustrated, which is intended to receive stock of the maximum size which can be handled by the machine, the cuts 15 do not go through the wall of the bushing, so that the flat surfaces 17 are continuous.

The tongues 6 are flattened at their rear ends for engagement with the abutment shoulders 16, as is clear from Figures 4 and 7. The head 10 of the key 9 is preferably of the same radial height as the abutment rib 13 and extends rearwardly therebeyond as shown in Figure 5. When the bushing is assembled in the shell, the head 10 of the key 9 is positioned in a notch 18 formed in the front edge of the shell, as shown in Figure 8. The notch is formed with an abrupt shoulder 19 on the side engaged by the key 10 when the bushing is turned in the direction in which the stock rotates in the machine. On the opposite side the notch 18 is extended and terminates in an inclined shoulder 20. The portion of the notch of uniform depth extends circumferentially a sufficient distance to permit the bushing to be turned so as to free the shoulders 16 from the tongues 6. Further turning of the bushing causes the key 10 to ride up on the inclined shoulder 20 and start the bushing out of the shell, as illustrated in Figure 9. When the bushing is turned to free the shoulders 16 from engagement with the tongues 6 the flat surfaces 17 wedge against the inner surfaces of the tongues and force them outwardly. Thus the resilience of the tongues 6 pressing against the flat surfaces 17 resists turning movement of the bushing and normally holds the bushing in its proper assembled relation with the shell.

The bushing 7 illustrated closes upon the stock by its own resilience and is further urged radially inward upon the stock by the spring 11, by the inward pressure of the two sections of the shell formed by the slots 3, and by the pressure of the tongues 6. The amount of force applied by each of these different means may be adjusted as desired to vary the distribution of the pressure of the bushing upon the stock through the length of the bushing. The spring 11 may be adjusted to balance the force exerted by the split shell and the tongues 6, or when desired may supply additional pressure at the front to insure a good grip of the bushing on the extreme end of the stock so that the waste from the ends of bars is reduced to a minimum. Likewise, when desired, all of the gripping force may be obtained from the shell and bushing, the spring 11 acting merely as a retaining ring for the key 9. When the stock is removed from the bushing, causing it to collapse to close the slot 21, the shell likewise collapses so that the parts remain in their proper assembled relation at all times.

In Figures 10 to 21, inclusive, I have shown a slightly different form of pusher embodying my invention. In this form the shell 30, as in the embodiment previously described, is provided with longitudinal slots 33 dividing the same into two halves which are given an initial inward set before hardening.

The shell is likewise formed with U-shaped cuts 35 forming inwardly pressing tongues 36. The bushing 37 is a one-piece tube having cuts 38 extending into the same from the rear end toward, but not reaching, the front end, and similar cuts 39 extending into the bushing from the front end, toward, but not reaching, the rear end. As shown the cuts 38 and 39 extend through more than one-half the length of the bushing so that the bushing is resiliently expansible throughout its length.

Intermediate its ends the bushing is turned down to form a groove 40 and is milled longitudinally to form recesses 41 communicating with the groove 40 and extending to the rear end of the bushing. This leaves spaced arcuate shoulders 42 on the bushing which face forwardly and which are designed to be engaged by the rear ends of the resilient tongues 36 on the shell. The recesses 41 are of sufficient width to receive the resilient tongues 36, for removal and replacement of the bushing. At its forward end the bushing is formed with spaced flanges 43 and 44, the flange 43 being arranged to engage the front end of the shell 31 to limit the movement of the bushing into the shell. The flange 44 may be knurled if desired to facilitate handling.

The bushing is also formed with a longitudinally extending slot 45 to receive a key 46. This slot cuts through the flanges 43 and 44 and is arranged to permit the key 46 to lay flush with the groove between the flanges 43 and 44. The key is formed with a notch 47, and a spring 48 is positioned in the groove between the flanges 43 and 44 and in the notch 47 of the key, as shown in Figure 16. The front end of the shell is formed with a notch 49 cut into the free edges formed by one of the slots 33 to receive the end of the key 46, as shown in Figure 15.

The spring 48 is also provided with a rearwardly facing notch 50 of a size to receive the key 46. Normally the spring is turned in its groove so that the notch 50 is out of alignment with the key 46, as illustrated in Figure 15, so that the key is prevented from escaping from the notch 49 in the shell 31. In this normal position, with the key 46 seated in the notch 49, the tongues 36 are likewise seated against the forwardly facing shoulders 42 of the bushing so that the bushing is firmly held in position in the shell. When it is desired to remove the bushing the spring 48 is turned to align the notch 50 with the key 46. The key is then pushed forwardly into the notch 50, freeing the key from the notch 49 in the shell, and the entire bushing is then turned in either direction to align the tongues 36 with the recesses 41, after which the bushing may be withdrawn forwardly from the shell.

As in the embodiment previously described, the shell collapses upon the bushing so as to retain the parts in their proper assembled relation at all times whether or not there is stock gripped within the bushing. Similarly the spring pressure of the bushing upon the stock is obtained not only from the inherent resilience of the bushing but from the inward pressure of the shell itself, the pressure of the tongues 36, and, when desired, the tension of the spring 48. This permits a distribution of the gripping pressure of the bushing in any desired manner and also, as in the previous embodiment, provides a safety factor in that the spring pressure is derived from a number of different kinds of spring elements so that failure of one will not result in complete loss of gripping pressure of the bushing.

The embodiment illustrated in Figures 10 to 16 has the advantage that it may be used in machines in which the spindles are rotated in both directions since in normal working position the bushing is held against rotation with respect to the shell in either direction.

A further modification is illustrated in Figures 17 to 21 in which the key and its associated parts are omitted and the bushing is frictionally retained against rotation in the shell by the resilience of the tongues 36. In this form the bushing is provided with circumferentially flattened shoulders 51, and the rear ends of the tongues 36 are similarly flattened to cooperate therewith as shown in Figure 20. Thus the engagement of the tongues 36 against the flattened portions of the shoulders 42 not only prevents forward movement of the bushing in the shell, but resiliently resists rotation of the bushing. As in the embodiment disclosed in Figures 1 to 9 the bushing may be removed by rotating the same with sufficient force to overcome the resistance of the tongues 36 until the tongues are forced out of engagement with the shoulders 51, at which time the bushing may be withdrawn forwardly from the shell. The forward end of the bushing is provided with a single flange 52 which abuts the forward end of the shell 31 and which may be knurled to facilitate handling. It will be evident that the shoulders for engagement with the tongues 36 in this form may be provided by transverse cuts as in the embodiment illustrated in Figures 1 to 9, inclusive.

A further modification of the invention is illustrated in Figures 22 to 31 inclusive. In this form the shell 61 is not split, as in the embodiment previously described, but is provided with U-shaped cuts 62 forming inwardly directed resilient wings 63. U-shaped cuts 64 in the wings 63 form tongues 65, which are bent inwardly from the inner surface of the resilient wings 63.

Two different forms of bushings are illustrated for use with the shell 61. That shown in Figures 25 to 28 is relatively short and comprises three separate segments, while the bushing shown in Figures 29 to 31 is longer and is a single expansible tubular member. The latter form is found more desirable for use with the larger diameters of stock to be gripped by the pusher up to and including stock of the maximum capacity of the machine, while the shorter segmental bushing is preferable for the smaller sizes of stock to be handled by the same pusher.

The bushing shown in Figures 25 to 28 consists of three segments 66 separated from each other by radial slots 67. At its front end the bushing is formed with a flange 68 to abut the forward edge of the shell 61 and limit the movement of the bushing into the shell. At its rear end the bushing is turned down to form a groove 69, beyond which are rearwardly projecting lugs 70 having forwardly facing shoulders 71 to engage the rear ends of the tongues 65. Intermediate its length the bushing is turned down to provide a groove 72 to receive an annular spring 73.

The bushing is preferably made from a tubular member which is turned down to form the flange 68, the groove 72, and the groove 69, leaving a ring beyond the groove 69. The rear end of the bushing is then straddle milled so as to cut into the groove 69, leaving segments of the rear end forming the lugs 70. Thereafter the bushing is formed into three parts by cutting the radial slots 67.

A key 74 having a thin extended end 75 is arranged to be seated in a key slot 76, which may conveniently be formed in radial alignment with one of the slots 67 before cutting the same. The key slot 76 is extended through the groove 72 and is of such depth that the extension 75 of the key, when seated in the slot, projects radially a slight distance beyond the bottom of the groove 72. The spring 73 is then placed in the groove 72 and its tension frictionally presses the extension 75 of the key 74 against the bottom of the key slot 76. As shown in Figure 25, the key 74 projects rearwardly past the flange 68 and is arranged to enter a notch 77 formed in the front edge of the shell 61.

The bushing is shown assembled in the shell in Figure 28 with the key 74 seated in the notch 77 and the tongues 65 engaged with the abutment shoulders 71. In this relation the bushing is firmly secured in the shell. When it is desired to remove the bushing the key 74 may be pulled forwardly against the frictional resistance provided by the spring 73 until it escapes from the notch 77. The flange 68 of the bushing may then be grasped and the bushing turned in either direction until the abutment shoulders 71 pass beyond the rear ends of the tongues 65, at which time the bushing may be withdrawn forwardly from the shell. It is unnecessary to remove the key from the assembled bushing since the release of the bushing may be effected by simply pulling the key a short distance, leaving the extended end 75 engaged under the spring 73.

The one-piece bushing that may be used for the larger sizes of stock to be handled is illustrated in Figures 29 to 31. This bushing comprises a one-piece tubular member 80 made resiliently expansible by slots 81 extending inwardly from the rear end and similar slots 82 extending inwardly from the front end. As in the form shown in Figure 12, the slots extend past each other but do not cut completely through the bushing. The forward end of the bushing is identical with that shown in Figures 25 to 28 and the key 74 is held in position by the spring 73 in the same manner. At its rear end the bushing is formed with recesses 83 extending longitudinally and communicating with the groove 69. These recesses are of sufficient width to receive the tongues 65 between the recesses. Forwardly facing abutment shoulders 71 are formed as in the three-piece bushing shown in Figure 25. To remove this type of bushing from the shell it is only necessary to slide the key 74 forwardly, turn the bushing until the tongues 65 pass the abutment shoulders 71 and are aligned with the grooves 83, and then withdraw the bushing forwardly from the shell.

The purpose of the longer one-piece bushing 80 is to provide greater gripping pressure extended over a longer area in order to have sufficient spring tension to handle the larger sizes of stock which have greater mass and therefore are more liable to slip in the pusher. For the smaller sizes less gripping pressure is required and bushings of the type shown in Figures 25 to 27 may be used in the same shell.

It will be understood that the various features shown in the various different forms of my invention may be interchanged from one form to another, and likewise that many other modifications and variations may be resorted to without departing from the scope of the invention as defined in the following claims. It will also be understood that many of the features disclosed herein may be used in connection with pushers having wedging surfaces to increase the frictional grip of the pusher on the forward stroke, such as shown in my copending applications, Serial No. 387,476, filed April 8, 1941, now Patent No. 2,323,067, granted June 29, 1943, and Serial No. 390,601, filed April 26, 1941.

I claim:

1. A pusher comprising a resiliently expansible shell, an expansible bushing within the shell, a spring surrounding the bushing and compressing the same radially inward upon the stock to be fed, said bushing projecting from one end of the shell and having an outwardly extending abutment engaging said end of the shell and preventing relative axial movement of the shell and bushing in one direction, and interengaging abutments on the shell and bushing preventing relative axial movement thereof in the other direction.

2. A pusher comprising a shell, an expansible bushing within the shell surrounding the stock to be fed, means removably securing said bushing within said shell including a tongue cut from the wall of the shell and resiliently pressing against said bushing to urge the same against the stock, the free end of said tongue being flattened to extend substantially chordally with respect to the shell, and said bushing being formed with a chordal recess, the bottom of the recess being flat and engaging the inner surface of the flattened end of said tongue, and one side of the recess being substantially radial and engaging the free end of the tongue to prevent relative axial movement of the shell and bushing in one direction, the engagement of said tongue with the bottom of said recess resiliently resisting relative rotation of said shell and bushing.

3. A pusher comprising a shell, an expansible bushing within the shell surrounding the stock to be fed, means removably securing said bushing within said shell including a wing cut from the wall of the shell and resiliently pressing against said bushing to urge the same against the stock, a tongue cut from said wing and extending inwardly therefrom and an abutment on said bushing engaging said tongue and preventing relative axial movement of said shell and bushing in one direction.

4. A pusher comprising a shell, an expansible bushing within the shell, interengaging abutments on the shell and bushing to prevent relative axial movement of the shell and bushing in one direction, said bushing having an enlarged portion disposed outside of said shell and engaging the end of the shell to prevent relative axial movement of the bushing and the shell in the other direction, and means on the bushing engaging a notch formed in the end edge of said shell and preventing relative rotation of said bushing and said shell in at least one direction.

5. A pusher comprising a shell, an expansible bushing within the shell, interengaging abutments on the shell and bushing to prevent relative axial movement of the shell and bushing in one direction, said bushing having an enlarged portion disposed outside of said shell and engaging the end of the shell to prevent relative axial movement of the bushing and the shell in the other direction, a key carried by the bushing engaging a notch formed in the end edge of said shell and preventing relative rotation of said bushing and said shell in at least one direction, and a band surrounding said bushing and key and holding said key in position.

6. A pusher comprising a shell, an expansible bushing within the shell, interengaging abutments on the shell and bushing to prevent relative axial movement of the shell and bushing in one direction, said bushing having an enlarged portion disposed outside of said shell and engaging the end of the shell to prevent relative axial movement of the bushing and the shell in the other direction, the end of said shell being formed with a notch, said enlarged portion of said bushing being formed with an axially extending key slot, a key slidably mounted in said key slot and arranged to engage said notch to prevent relative rotation of said bushing and shell, and a spring surrounding said bushing and key and retaining said key in said slot and frictionally holding said key against sliding movement in said slot.

7. A pusher comprising a shell, an expansible bushing within the shell, interengaging abutments on the shell and bushing to prevent relative axial movement of said shell and bushing in one direction, said bushing having an enlarged portion disposed outside of said shell and engaging the end of the shell to prevent relative axial movement of the bushing and the shell in the other direction, the end of said shell being formed with a notch, said enlarged portion of the bushing being formed with an axially extending key slot, a key disposed in said slot and engaging said notch to prevent relative rotation of said shell and bushing in at least one direction, and a spring band surrounding said enlarged portion of the bushing and retaining said key in said key slot.

8. A pusher comprising a shell, a bushing extending into the shell from one end thereof, abutment means on said shell and said bushing alined with each other in one relative angular position of said shell and bushing to prevent withdrawal of said bushing from said shell, and out of alinement with each other in another relative angular position to permit withdrawal of the bushing from the shell, said bushing being formed with a longitudinally extending key slot, said one end of the shell being formed with a notch, and a key disposed in said slot and arranged to engage said notch to prevent relative rotation of said shell and bushing in at least one direction.

9. A pusher comprising a shell, a bushing extending into the shell from one end thereof, abutment means on said shell and said bushing alined with each other in one relative angular position of said shell and bushing to prevent withdrawal of said bushing from said shell, and out of alinement with each other in another relative angular position to permit withdrawal of the bushing from the shell, the portion of said bushing outside of said shell being formed with an annular groove and a longitudinally extending key slot, said one end of the shell being formed with a notch, a key disposed in said slot and arranged to engage in said notch, and a split ring seated in said groove and holding said key in its slot.

10. A pusher comprising a shell, a bushing extending into the shell from one end thereof, abutment means on said shell and said bushing alined with each other in one relative angular position of said shell and bushing to prevent withdrawal of said bushing from said shell, and out of alinement with each other in another relative angular position to permit withdrawal of the bushing from the shell, a key carried by said bushing for axial sliding movement, said shell having an abutment surface for engagement with said key in one position thereof to prevent relative rotation of said shell and bushing, said key being slidable to a position out of engagement with said surface to permit relative rotation of said shell and bushing.

11. A pusher comprising a shell, a bushing extending into the shell from one end thereof, abutment means on said shell and said bushing alined with each other in one relative angular position of said shell and bushing to prevent withdrawal of said bushing from said shell, and out of alinement with each other in another relative angular position to permit withdrawal of the bushing from the shell, a key slidably carried by said bushing, said shell having an abutment surface to engage said key in one position thereof to prevent relative rotation of said bushing and shell, a band surrounding said bushing and key and arranged to engage a portion of said key to hold the same in engagement with said abutment surface, said band having a notch arranged to be brought into alinement with said key by rotation of said band, said notch being of such size as to permit said key to be slid into the same and out of engagement with said abutment surface.

12. A pusher comprising a shell, a bushing within the shell resiliently gripping the stock to be fed, said bushing projecting from one end of the shell and having an outwardly extending abutment engaging said end of the shell and preventing relative axial movement of the shell and bushing in one direction, and a tongue cut from the wall of said shell with its free end facing away from said one end of the shell and normally projecting into the shell, said bushing being formed with an abutment engaging the free end of said tongue and preventing relative axial movement of said shell and bushing in the other direction.

13. A pusher comprising a resiliently expansible shell, a bushing within the shell resiliently gripping the stock to be fed, said bushing being resiliently gripped by the shell, said bushing projecting from one end of the shell and having an outwardly extending abutment engaging said end of the shell and preventing relative axial movement of the shell and bushing in one direction, and a tongue cut from the wall of said shell with its free end facing away from said one end of the shell and normally projecting into the shell, said bushing being formed with an abutment engaging the free end of said tongue and preventing relative axial movement of said shell and bushing in the other direction.

14. A pusher comprising a shell, an expansible bushing within the shell surrounding the stock to be fed, means removably securing said bushing within said shell including a tongue cut from the wall of the shell stressed to project into the shell and engaging the outer surface of said bushing, said tongue resiliently pressing against said bushing to urge the same against the stock, and an abutment on said bushing engaging the end of said tongue and preventing relative movement of said shell and bushing in one direction.

15. A pusher comprising a shell, an expansible bushing within the shell surrounding the stock to be fed, means removably securing said bushing within said shell including a tongue cut from the wall of the shell stressed to project into the shell and engaging the outer surface of said bushing, said tongue resiliently pressing against said bushing to urge the same against the stock, the free end of said tongue being flattened, and a chordally extending recess in the exterior of said bushing forming an abutment engaging the end of said tongue and preventing relative movement of said shell and bushing in one direction.

STODDARD B. MARTIN.